United States Patent
Clarkson et al.

(10) Patent No.: US 6,823,853 B2
(45) Date of Patent: Nov. 30, 2004

(54) THERMAL MODELING OF A SWITCHED RELUCTANCE MOTOR

(75) Inventors: Ian David Clarkson, Chelmsford (GB); Sunoj Cherian George, Basildon (GB)

(73) Assignee: Visteon Global Technologies, Inc., Van Buren Township, MI (US)

(*) Notice: Subject to any disclaimer, the term of this patent is extended or adjusted under 35 U.S.C. 154(b) by 68 days.

(21) Appl. No.: 10/422,102

(22) Filed: Apr. 24, 2003

(65) Prior Publication Data

US 2004/0206341 A1 Oct. 21, 2004

(30) Foreign Application Priority Data

Apr. 26, 2002 (EP) .............................................. 02252978

(51) Int. Cl.[7] .............................................. F02B 33/00
(52) U.S. Cl. .................................................. 123/559.1
(58) Field of Search ............................. 123/559.1, 563, 123/564, 565, 559.2, 561

(56) References Cited

U.S. PATENT DOCUMENTS 4,714,065 A  12/1987  Cascajosa
5,539,601 A  7/1996  Farag

FOREIGN PATENT DOCUMENTS

WO  WO02/10580  7/2002

*Primary Examiner*—Bibhu Mohanty
(74) *Attorney, Agent, or Firm*—Brinks Hofer Gilson & Lione

(57) ABSTRACT

The present invention relates to a supercharger system and a method for thermal modeling of a switched reluctance motor for supercharging an internal combustion engine. The supercharger system comprising: A supercharger driven by an electric motor, the motor having a rotor that rotates at an angular speed ω to draw a mass airflow volume V; a controller that controls the operation of the supercharger; a sensor for sensing a measure of the rotor angular speed ω and a sensor for sensing the mass airflow volume V. The controller is adapted to calculate using the temperature T of at least one component of the supercharger.

11 Claims, 3 Drawing Sheets

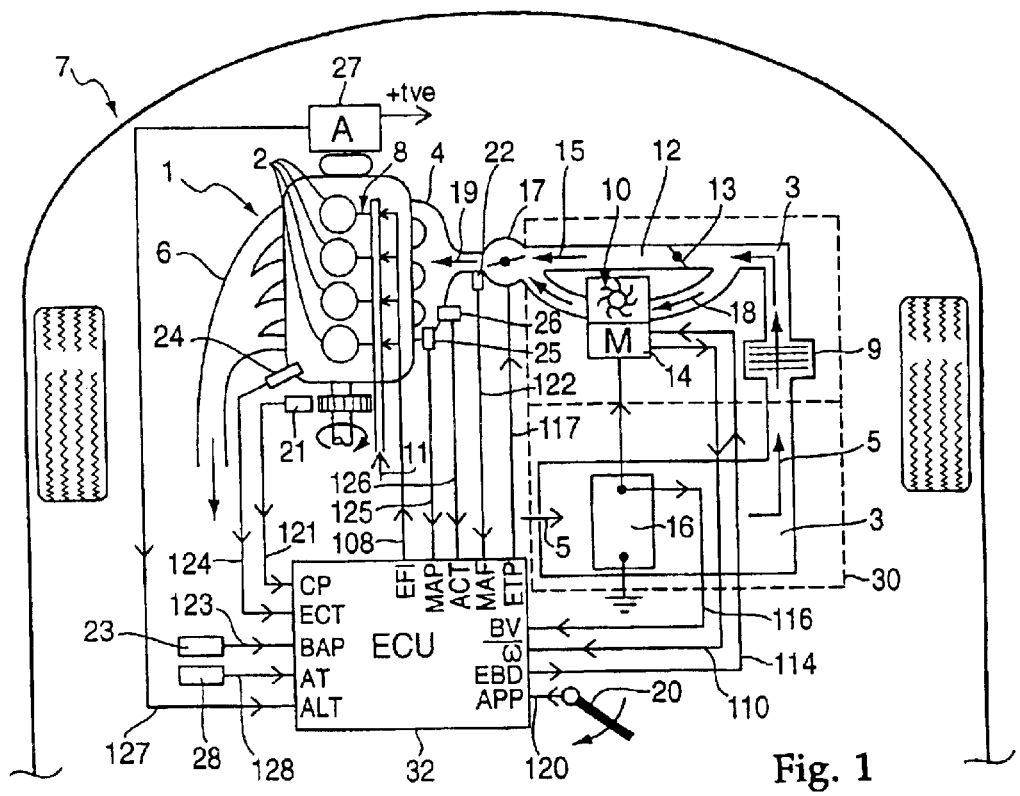
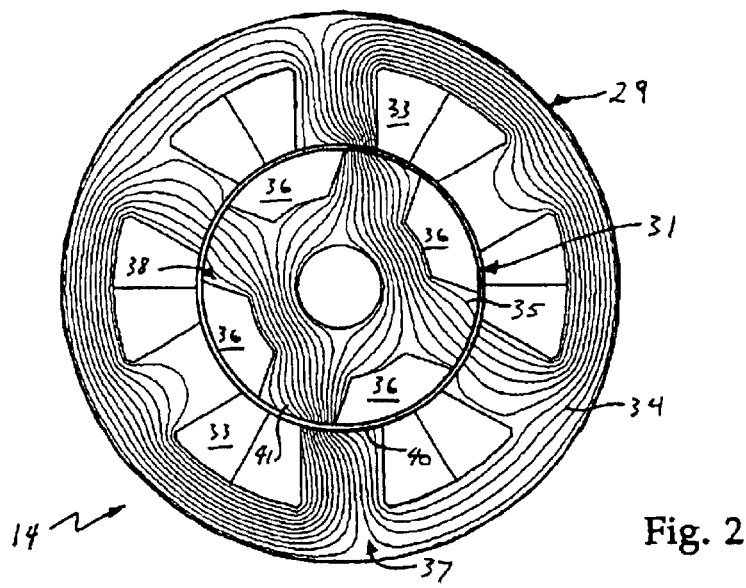
Fig. 1
Fig. 2

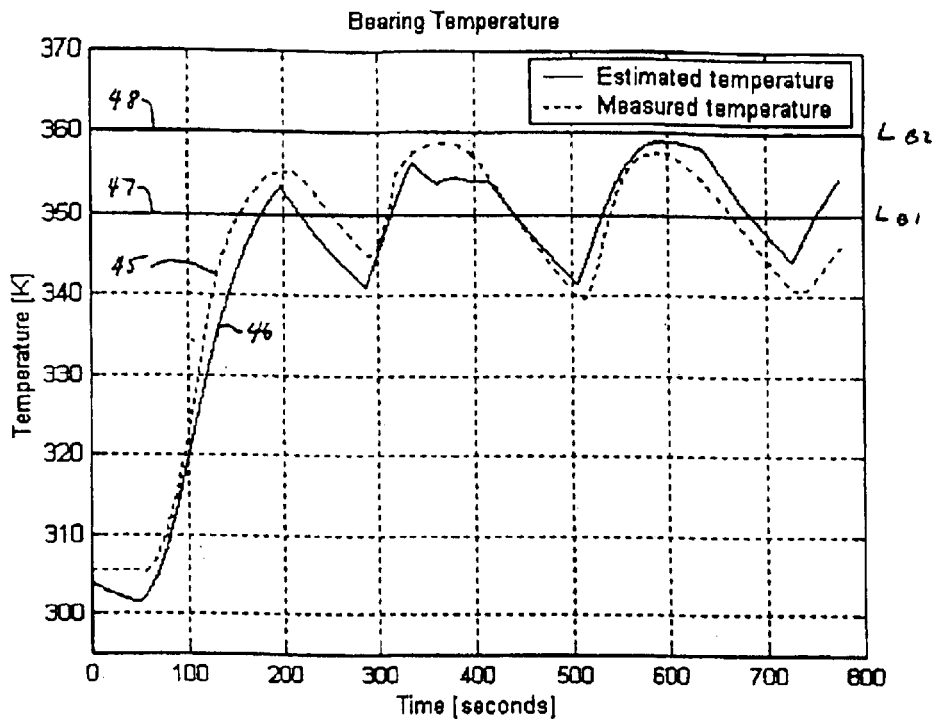
Fig. 3
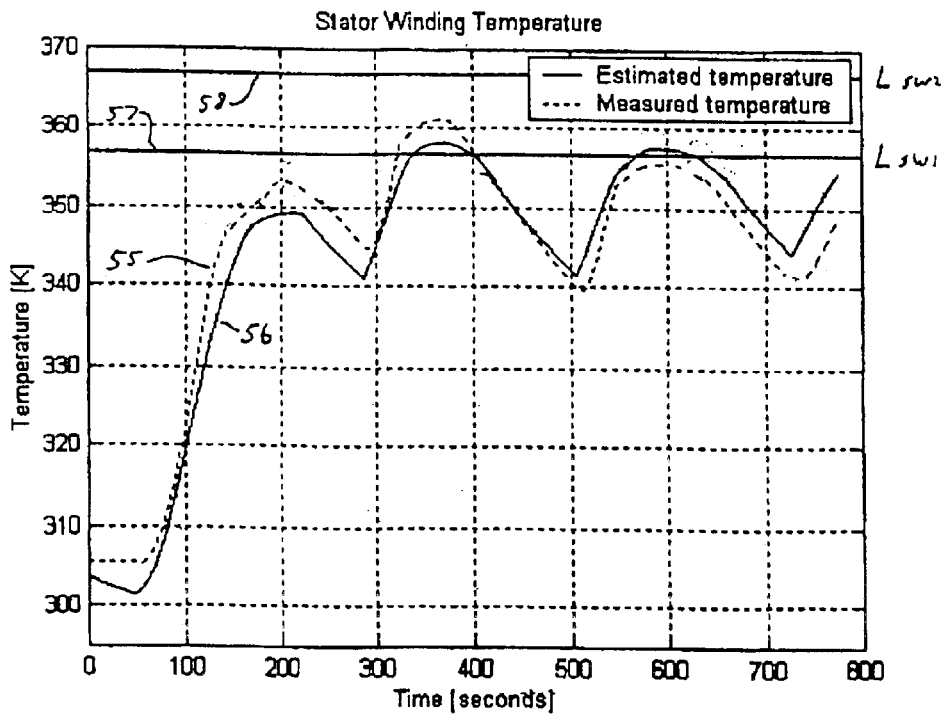

THERMAL MODELING OF A SWITCHED RELUCTANCE MOTOR

BACKGROUND OF THE INVENTION

1. Field of the Invention

The present invention relates to the thermal modeling of a switched reluctance motor, and particularly a switched reluctance motor used for supercharging an internal combustion engine.

2. Description of Related Art

The electric currents and friction in an electric motor generate heat that can damage motor components such as electrical connections, electrical insulation or motor bearings. These problems are particularly acute in an electric motor used to power a supercharger coupled to an engine owing to the need for high rotational speeds, for example 70,000 rpm, needed to spin a supercharger turbine. Such a motor can consume 300 A of current at 12 V during continuous operation. When the supercharger is initiated, transient currents as high as 450 A may be needed in order to reach an operational rotational speed within about 1 s. It is also necessary to maintain close mechanical tolerances in the bearings and between the rotor and stator. It is therefore necessary to maintain the temperature of the motor components below allowable limits in order to prevent damage to the motor and to achieve a useful operational lifetime.

The temperature of some parts of the motor, for example the stator or bearings, may be measured with a temperature sensor. This, however, adds cost and complexity, as it then becomes necessary to position the sensors within or close to the component for which a temperature reading is needed. The sensors must then also be wired to the supercharger controller. For some components, particularly a rotor, it may not be possible or economic to provide a temperature sensor.

SUMMARY OF THE INVENTION

One solution to this problem may be to calculate the temperature of the motor components, using a mathematical model. A very accurate calculation could be performed using a finite element model, taking as its inputs known supercharger operational parameters. To be useful, however, a model must be capable of generating results in near-real-time, for example, within 0.1 S. An accurate finite element model to calculate supercharger temperatures will be too slow to run using a typical automotive electronic processor.

It is an object of the present invention to provide an apparatus and method for modeling the temperatures in an electric motor for supercharging an internal combustion engine.

According to the invention, there is provided a supercharger system for an internal combustion engine, comprising:

a supercharger adapted to supply air to the engine, the supercharger being driven by an electric motor having a rotor, the rotor rotating at an angular speed $\omega$ when the supercharger is energized with electric current and the supercharger thereby drawing a mass airflow volume V;

a controller adapted to operate the supercharger;

an angular speed sensor coupled to the controller a measure the angular speed $\omega$ of the rotor;

an air flow volume sensor coupled to the controller to measure the mass airflow volume V;

wherein the controller is adapted to calculate the temperature T of at least one component of this supercharger, using the measures of the rotor angular speed $\omega$ and the mass airflow volume M, wherein the equation to calculate T is:

$$T(t_n) = aT(t_{n-1}) + b\omega(t_{n-1}) + cV(t_{n-1}) + d\omega(t_{n-1})T(t_{n-1}) + eV(t_{n-1})T(t_{n-1}) \quad [1]$$

where:

the calculation is performed iteratively at time intervals at $\Delta t$ starting at an initial time $t_0$ and for subsequent times $t_n = t_{n-1} + \Delta t$, n=1,2,3 ...;

$T(t_n)$ is the calculated temperature of the component at a time $t_n$;

$T(t_{n-1})$ is the calculated temperature of the component at a time $t_{n-1}$;

$V(t_{n-1})$ is the measured mass airflow volume at time $t_{n-1}$;

$\omega(t_{n-1})$ is the rotor angular speed at time $t_{n-1}$;

$T(t_0)$ is a known temperature of the component at the initial time $t_0$; and a, b, c, d, and e are constant values.

Also according to the invention, there is provided a method of controlling the operation of a supercharger system for an internal combustion engine, the system comprising a supercharger (10) with a rotor (31) for supplying air to the engine, an electric motor (14) for driving the supercharger (10), and a controller (32) adapted to operate the supercharger (10), comprising the steps of:

using the electric motor (14) to drive the supercharger (10) at an angular speed $\omega$ and to draw through the supercharger (10) a mass airflow volume V;

measuring the angular speed $\omega$ the rotor;

measuring the mass airflow volume V of the supercharger;

calculating the temperature T of at least one component of the supercharger, using the measures of the rotor (31) angular speed $\omega$ and the mass airflow volume V;

wherein the equation to calculate T is:

$$T(t_n) = aT(t_{n-1}) + b\omega(t_{n-1}) + cV(t_{n-1}) + d\omega(t_{n-1})T(t_{n-1}) + eV(t_{n-1})T(t_{n-1}) \quad [1]$$

where:

the calculation is performed iteratively at time intervals $\Delta t$ starting at an initial time $t_0$ and for subsequent times $t_n = t_{n-1} + \Delta t$, n=1,2,3 ...;

$T(t_n)$ is the calculated temperature of the component at a time $t_n$;

$T(t_{n-1})$ is the calculated temperature of the component at a time $t_{n-1}$;

$V(t_{n-1})$ is the measured mass airflow volume at time $t_{n-1}$;

$\omega(t_{n-1})$ is the rotor angular speed at time $t_{n-1}$;

$T(t_0)$ is a known temperature of the component at the initial time $t_0$; and a, b, c, d, and e are constant values controlling the operation of the supercharger (10) in accordance with said calculated temperature.

A main advantage of the invention is that it makes use of temperature measurements that are normally available in an automotive environment, for example ambient temperature, the temperature of engine coolant, or the temperature of the inlet air. From this, it is possible to calculate the initial temperature of the various components of the supercharger.

The form of bilinear equation [1] can readily be implemented in software in existing engine control unit hardware to achieve a near real-time calculation of supercharger motor temperatures, and so imposes no additional cost burden in terms of improved computational electronics.

The controller may then be adapted to calculate the temperature $T_R(t_n)$ of the rotor.

If the rotor spins on bearings, the controller may be adapted to calculate the temperature $T_{RB}(t_n)$ of the rotor bearings according to equation [1].

The electric motor will generally have a stator and the controller may then be adapted to calculate the temperature $T_S(t_n)$ of the stator according to equation [1].

The temperature of stator windings $T_{SW}(t_n)$ through which electrical current flows when the electric motor is energized may also be calculated according to equation [1].

In general, the stator will have a stator core through which magnetic flux is concentrated when the electric motor is energized. The controller may then be adapted to calculate the temperature $T_{SC}(t_n)$ of the stator core according to the equation $$T_{SC}(t_n) = AT_{SC}(t_{n-1}) + BT_{SW}(t_{n-1}) + CT_{SW}(t_{n-1})T_{SC}(t_{n-1}) \quad [2]$$

where the calculation is performed iteratively at time intervals $\Delta t$ starting at an initial time $t_0$ and for subsequent times $t_n = t_{n-1} + \Delta t$, $n = 1, 2, 3 \ldots$ $T_{SC}(t_n)$ is the calculated temperature of the stator core component at a time $t_n$;

$T(t_{n-1})$ is the calculated temperature of the stator core at a time $t_{n-1}$;

$T_{SC}(t_0)$ is a known temperature of the stator core at the initial time $t_0$;

$T_{SW}(t_{n-1})$ is the temperature of the stator windings at a time $t_{n-1}$, calculated according to equation [1]; and A, B and C are constant values.

This equation makes us of previously calculated values for the temperature $T_{SW}(t_{n-1})$ of the stator windings, and so places minimal additional computational requirements on electronic hardware.

The engine may comprise one or more sensors for providing the controller a measure of the temperature of one or more engine operating parameters. The controller may then be adapted to calculate said initial temperature $T(t_0)$ from said measure(s) of one or more engine operating parameters.

BRIEF DESCRIPTION OF THE FIGURES

The invention will now be described in further detail, and by way of example only, with reference to the accompanying drawings, in which:

FIG. 1 is a schematic diagram of a motor vehicle having a 1.4 liter, four cylinder engine system with an supercharging system according to the invention that has an electrically driven supercharger and a controller that calculates the an estimated temperature for several components of the supercharger;

FIG. 2 is a schematic cross-section through the supercharger motor showing a stator and a rotor, each of which has copper windings and an iron core;

FIG. 3 is a graph comparing the measure temperature of the supercharger rotor bearings and the estimated temperature of the supercharger rotor bearings and the estimated temperature of these bearings as calculated by the controller;

FIG. 4 is a graph comparing the measured temperature of the supercharger stator windings and the estimated temperature of these windings as calculated by the controller.

DETAILED DESCRIPTION

Figure 5:
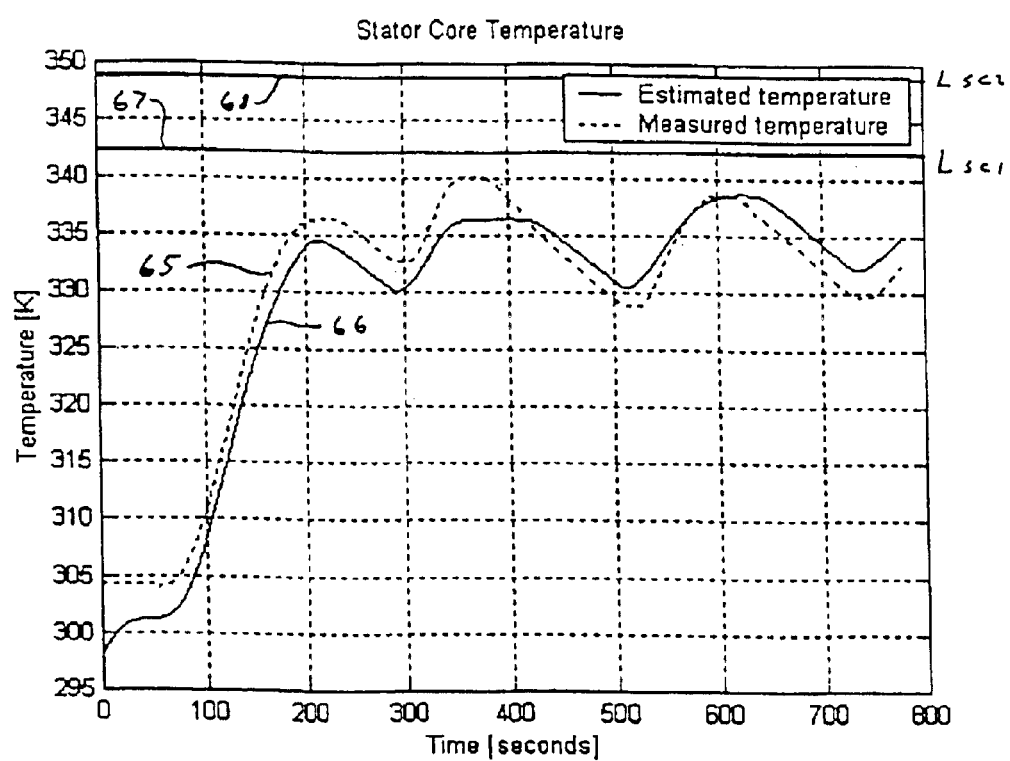
FIG. 5 is a graph comparing the measured temperature of the supercharger stator core and the estimated temperature of this core as calculated by the controller.

FIG. 1 shows schematically part of a motor vehicle 7 having a reciprocating piston Internal combustion engine 1, with four in-line cylinders 2, an air inlet manifold 4 and an exhaust manifold 6 leading respectively to and from each of the cylinders 2. A fuel injection system 8 supplies fuel 11 to cylinders 2 in a manner well-known in the art. An electronic boost device 10, (hereafter a supercharger) is provided upstream of the inlet manifold 4.

FIG. 1 shows schematically part of a motor vehicle 7 having a reciprocating piston internal combustion engine 1, with four in-line cylinders 2, an air inlet manifold 4 and an exhaust manifold 6 leading respectively to and from each of the cylinders 2. A fuel injection system 8 supplies fuel 11 to cylinders 2 in a manner well-known in the art. An electronic boost device 10, (hereafter a supercharger) is provided upstream of the inlet manifold 4.

Air flows to the inlet manifold 4 through the supercharger 10 when this is operational, or when the supercharger is disabled or idling, through an air bypass conduit 12 in parallel with the supercharger 10. Air is supplied to the supercharger 10 and/or the bypass 12 along an inlet air path 3.

The air bypass conduit 12 has an air valve 13 that automatically opens to permit inlet air 5 to bypass 15 the supercharger 10 when airflow 18 through the supercharger is insufficient to charge the engine cylinders 2 with air. Air supply 19 to the engine 1 is then controlled by the setting of an electronically controlled throttle valve 17 downstream of the supercharger 10 and bypass 12, and the activation of the supercharger 10. When the supercharger 10 is not activated, the engine 1 is normally aspirated, and when the supercharger 10 is activated, the airflow to the engine is increased.

The supercharger 10 is driven only by a switched reluctance electrical motor (M) 14 powered by a 12-volt lead/acid vehicle battery 16. The battery is recharged by an engine-driven battery recharger, here a belt-driven alternator 27. The battery 16 has a current rating which is about 30 A higher than would normally be specified for a mass-market four cylinder engine motor car. In addition to powering the supercharger 10, the battery 16 also provides for the vehicle starting, lighting and ignition requirements. The battery 16 also lies within the air supply path 3, within a hollow enclosure 30 that surrounds the battery 16 and supercharger 10, so that inlet air 5 flows around the battery 16. An air filter 9 is provided in the air supply path 3 downstream of the battery 16 and upstream of the supercharger 10 and air bypass 12.

The vehicle driver (not shown) can control the engine power via a movable accelerator pedal assembly 20, that provides an electrical signal 120 to an engine control unit (ECU) 32 indicative of accelerator peddle position (APP).

The engine control unit monitors several engine operating parameters via nine input lines 116,120–127. One line 116 is connected to the battery supply so that an A/D converter (not shown) within the ECU 32 can measure the battery 16 voltage. Another input line 127 comes from the alternator, which has its own internal electronics and processor (not shown) that monitor the temperature of the alternator, and also capacity ultilization of the alternator, depending on the alternator temperature, alternator rotational speed and current drawn from the alternator. The alternator capacity utilization is communicated from the alternator to the ECU 32 along the line 127.

Seven other input lines 120–126 are each connected to a corresponding sensor device 20–26 for measuring engine operating conditions. The sensors include: the accelerator pedal assembly (APP) 20 for measuring driver demand; a crank position (CP) sensor 21 for measuring engine speed; a mass air flow sensor (MAF) 22 downstream of the throttle value 17 for measuring directly the amount of air entering the cylinders 2; a barometric air pressure (BAP) sensor 23 for measuring atmospheric pressure; an engine coolant temperature (ECT) sensor 24 for measuring the temperature of coolant circulating with the engine; a manifold air pressure (MAP) sensor 25 for measuring the pressure of air in the inlet manifold 4; and an inlet air charge temperature (ACT) sensor for measuring the temperature of the inlet air.

Additionally, an ambient temperature (AT) sensor 28 measures the ambient air temperature and provides an input line 128 to the electronic control unit 32.

The supercharger motor 14 provides a rotor speed signal (ω) 110 to the engine control unit 32. Alternatively, the supercharger motor 14 may have its own control unit which may receive a speed demand command from the ECU 32, and then control the operation of the supercharger to maintain the desired speed. In this case, there may be no need for the signal line 110, as the ECU can take the rotor rotational speed ω to be the demanded speed. In either case, the ECU can then calculate temperature parameters for components in the supercharger 10 based on the ambient temperature signal 128 from the ambient temperature sensor 28, and the speed and duty cycle of the supercharger 10.

The engine control unit 32 calculates an engine torque demand from the various input signals, and provides a number of output signals to control various vehicle and engine operating parameters, including a fuel injection control signal 108, throttle valve control signal 117 and a supercharger motor control signal 114.

When the driver moves the accelerator pedal 20 to demand engine torque in excess of that which can be delivered by the engine 1 when naturally aspirated, the throttle valve 17 moves to a maximum setting to admit the maximum volume of air 19 into the cylinders 2. The engine control unit 32 then activates the supercharger motor 14 under certain moderate or low engine speeds, but not at high engine speeds. As long as the torque demand exceeds that available from natural aspiration of the engine alone, the boosted engine torque output is controlled by the supercharger speed ω and the amount of fuel supplied to the cylinders. As soon as torque demand falls within that available from natural aspiration, the electrically driven supercharger 10 is no longer driven by the supercharger motor 14.

This helps to conserve battery lifetime and reduce heating of the supercharger 10, thereby preserving battery capacity and extending the lifetime of the supercharger 10. If the engine is an injection engine, the engine control unit 32 can control the amount of injected fuel 11 by electrical control 108 of the injectors 8.

When supercharger operation is required, the engine control unit 32 sets both the speed of the supercharger 10 and delivered fuel amount according to the current torque demand. The engine control unit 32 monitors the output 120–126 from the various sensors 20–26, as well as the battery voltage 116, and then adjusts the supercharger speed and/or the amount of delivered fuel 11 to achieve an appropriate level of rich or lean engine operation.

The engine control unit (ECU) 32 receives the various inputs 116,120–126 described above, in order to generate various outputs to control the operation of the system. One output is an electronic throttle position (ETP) command 117, used to control the electronic throttle valve 17.

The ECU 32 also sends an electronic boost device (EBD) command 114 to the supercharger motor 14. When the supercharger 10 is not required, the supercharger is controlled to idle at a relatively low regulated speed of about 10,000 rpm, which consumes relatively little electric power and which also produces no significant boost pressure. By idling the supercharger at 10,000 rpm, it is possible to reduce the spin up time to the rated operating speed of about 60,000 rpm to less than 0.3 s.

The supercharger 10 may not be capable of indefinite operation at its maximum output owing to limitations of the battery 16 storage and alternator 27 charging current, and so the battery state-of-charge (SOC) may restrict operation. However, this invention is concerned with thermal limitations to continuous, as opposed to intermittent use, owing to heat generated within the supercharger 10 by ohmic losses in the windings and cores, as well as frictional losses in the rotor bearings. At high operation duty factors, the temperature of the windings, core or bearings may exceed design temperature limits. It may therefore also be necessary to constrain the operation of the supercharger 10 owing to these considerations.

The engine control unit 32 uses the input 120–123 from the accelerator pedal position sensor 20, crankshaft position sensor 21, and barometric pressure sensor 23 to determine the required engine torque. The calculation will also take account of other relevant factors, such as engine friction, accessory losses and, for a spark ignition engine, the prevailing spark advance angle. From this, it is possible to calculate a desired air charge, that is, the amount of air, required for each cylinder ignition event.

The desired air charge, is then used by the ECU 32 together with other inputs, in particular the engine speed as measured from the crankshaft position 121, and the measured mass air flow 122 and/or the measured manifold pressure 125 in a calculation to determine the required manifold pressure and the required mass air flow (MAF). A determination is made within the calculation as to whether or not supercharger operation is required, based on whether or not the desired manifold pressure is greater than the barometric pressure, and if so, a hysteresis term is applied to avoid rapid cycling of the supercharger 10.

The engine control unit 32 is then able to schedule the desired throttle position and the supercharger speed, from which the ECU 32 generates the ETP command 117 and an unconstrained supercharger speed command.

As mentioned above, the supercharger speed command will in some circumstances need to be constrained, for example because of over-heating of the supercharger 10, the maximum rated speed or duty cycle of the device, owing to strength and lubrication considerations, or because of the battery state-of-charge (SOC) constraints. Constraints may also have to be applied to avoid regions in which the supercharger 10 would surge.

The engine control unit 32 then calculates a constrained supercharger speed command according to the prevailing operating conditions.

As described above, for all operating conditions that may be achieved without the operation of the supercharger device 10, that is, when inlet manifold air pressure (MAP) is less than barometric air pressure (BAP), the engine torque output will be regulated by the throttle valve 17 alone. If the supercharger 10 is not required then the supercharger is scheduled to operate at an idle speed where no boost is produced. In the event that the supercharger is required then the throttle is scheduled to be fully open and the supercharger speed is scheduled based on the barometric pressure, the desired manifold air pressure, and the desired manifold air flow according to a boost map of supercharger characteristics held within ECU memory (not shown).

Preferably, derating factors for the supercharger thermal and SOC constraints are applied as required to generate the final constrained EBD speed command 114. In the event that the system is constrained for both thermal limits and SOC considerations, then the largest derating factor is applied.

The calculation of the derating factors should be chosen so as to minimize driver perception of the derating, and also make the derated performance predicable for the driver, by avoiding sudden changes. The thermal derating calculation involves two parts, namely regulation and estimation. The estimation part of the calculation is based on the operating conditions of the supercharger 10. Both the present and future steady state temperatures of critical parts of the supercharger are estimated. Critical parts typically include the bearings supporting a supercharger shaft and copper windings of the supercharger motor. When the system is initialized, the temperatures of these parts are estimated based on the temperatures when the system was turned off, the time it has been off, and the prevailing ambient temperature, for example from an ambient temperature sensor 28. The dynamic temperature estimate accounts for variations in the air flowing past the supercharger, the thermal inertia of the component parts, and the heat generated in the system from both electrical and mechanical sources.

The regulation part involves predicting for which of the components in the system the design temperatures could be exceeded, based on estimated or measured temperatures. For these, the supercharger operation may be restricted in order to remain within design guidelines. This is achieved by the calibration of 'soft' and 'hard' limits for each of these components. When the temperature is below the soft limit no action is taken. When the temperature exceeds the soft limit and the temperature at the desired supercharger operation level will result in the hard limit being exceeded in a steady state operation, then some action must be taken to avoid exceeding the hard limit. The supercharger is progressively derated using a control loop with an output of predetermined percentage degrade factor until the predicted steady state temperature is equal to the hard limit, at which point the supercharger duty may be sustained. When more than one component of the system may exceed design values, a derating factor is calculated for each and the minimum one selected for use.

The way in which the temperature of motor components is calculated will now be described in detail. FIG. 2 shows schematically the form of a conventional switched reluctance motor 14. The switched reluctance motor 14 is a three-phase, 6/4 motor, air cooled unit, having an outer annular stator 29 and concentric with this an inner rotor 31. Both the stator 29 and the rotor 31 have copper coils 33,36 and an iron core 37,38 for concentrating lines of magnetic flux 34,35. Each core 37,39 has four circumferentially spaced poles 40,41 that align at one rotational orientation of the rotor 31 with respect to the stator 29. Not shown are motor bearings on which the rotor 31 spins.

The motor 14 works on the principle that if current is passed through one of the stator copper windings 33, a torque is generated by the attraction of the rotor pole 41 to the stator pole 40. It is possible to generate different models based on heat transfer equations depending on the level of complexity required. However, in many cases, the first-principle heat-transfer model requires parameters which are sometimes unavailable and do not include the variation over motor life-time. It has been found that the heat generated by electrical resistance in the coils and friction in the bearings can be modelled using a non-linear iterative calculation that can readily be implemented in existing engine control unit hardware. Unlike a conventional linear model such a bilinear model takes account of the interacting electrical and mechanical characteristics of the motor 14.

A particular class of non-linear models are bilinear models non-linearity, or bilinearity, arising as a product between state and control variables. The bilinear models utilized for characterizing the temperatures of the motor components are discrete-time models.

The models described below allow the estimation of temperatures within the motor 14 without the need for any temperature sensors in the motor itself. As a result, the overall cost of the unit can be brought down and the operation of the motor 14 can be constrained within thermal limits.

It has been found that although conventional linear heat transfer model does not provide an adequate estimation of the temperatures within the motor 14, the bilinear model of the invention can provide good results while placing a minimal additional burden on computation time within a conventional engine control unit 32. These models are constructed using measured temperature within a test motor, and then by using curve fitting algorithms to determine the values of constant coefficients that provide the best fit of calculated temperature to actual measured temperature.

It has been discovered that the three most important motor component temperatures as regards operational reliability and lifetime are the rotor bearing temperature $T_{RB}$, the stator copper winding temperature $T_{SW}$, and the stator iron core temperature $T_{SC}$.

In general, the temperatures in the motor are dependent on the supercharger speed demand, manifold air temperature (MAT) manifold air pressure (MAP) and manifold airflow (MAF) and the ambient temperature.

The temperature in the rotor bearings is principally dependent on the heat generated due to the speed of the rotor shaft $\omega$. Due to the cooling effect of the air flowing through the supercharger, the temperature rise is limited. Therefore, the heat generated is a function of the supercharger speed and the air temperature.

In practice, it has been found that adequate results are obtained by using the following iterative equation to calculate the temperature $T_{RB}$ of the rotor bearings:

$$T_{RB}(t_n) = aT_{RB}(t_{n-1}) + b\omega(t_{n-1}) + cV(t_{n-1}) + d\omega(t_{n-1})T_{RB}(t_{n-1}) + eV(t_{n-1})T_{RB}(t_{n-1})$$

where:

the calculation is performed iteratively at time intervals $\Delta t$ starting at an initial time $t_0$ and for subsequent times $t_n = t_{n-1} + \Delta t$, $n=1,2,3\ldots$;

$T_{RB}(t_n)$ is the calculated temperature of the bearing at a time $t_n$;

$T_{RB}(t_{n-1})$ is the calculated temperature of the bearing at a time $t_{n-1}$;

$V(t_{n-1})$ is the measured mass airflow volume at time $t_{n-1}$;

$\omega(t_{n-1})$ is the rotor angular speed at time $t_{n-1}$;

$T_B(t_0)$ is a known temperature of the bearing at the initial time $t_0$; and a, b, c, d, and e are constant values.

Although the equation does not explicitly include the air temperature, the effect of this is included in the use initial temperature $T_{RB}(t_0)$ and the manifold airflow volume $V(t_{n-1})$.

A plot against time t of measured 45 and estimated 46 bearing temperatures calculated using this equation are shown in FIG. 3, which shows a cyclic operation of the supercharger motor 14 over a period of about 13 minutes. The estimated beating temperatures have been calculated using the following constants:

| Coefficient | Constant Value |
| --- | --- |
| $a_{RB}$ | −0.9991 |
| $b_{RB}$ | 0.0023 |
| $c_{RB}$ | 0.0039 |
| $d_{RB}$ | −0.0072 |
| $e_{RB}$ | −0.0036 |

In the case of stator copper windings, the heat generated in the coil is a function of the current flowing in the windings 33 and the mass airflow volume V. Due to the effect of the air 18 flowing through the supercharger 10, the temperature rise is constrained.

It has been found that a similar equation can be used to estimate the stator copper winding temperature. This has the advantage of simplicity in implementing the models in the engine control unit 32. The model used for the estimation of the stator windings is:

$$T_{SW}(t_n) = aT_{SW}(t_{n-1}) + b\omega(t_{n-1}) + cV(t_{n-1}) + d\omega(t_{n-1})T_{SW}(t_{n-1}) + eV(t_{n-1})T_{SW}(t_{n-1})$$

where:

the calculation is performed iteratively at time intervals $\Delta t$ starting at an initial time $t_0$ and for subsequent times $t_n = t_{n-1} + \Delta t$, $n=1,2,3\ldots$;

$T_{SW}(t_n)$ is the calculated temperature of the stator winding at a time $t_n$;

$T_{SW}(t_{n-1})$ is the calculated temperature of the stator winding at a time $t_{n-1}$;

$V(t_{n-1})$ is the measured mass airflow volume at time $t_{n-1}$;

$\omega(t_{n-1})$ is the rotor angular speed at time $t_{n-1}$;

$T_{SC}(t_0)$ is a known temperature of the stator winding at the initial time $t_0$; and a, b, c, d, and e are constant values.

A plot against time t of measured 55 and estimated 56 stator winding temperatures calculated using this equation are shown in FIG. 4, which shows a cyclic operation of the supercharger motor 14 over a period of about 13 minutes. The estimated stator winding temperatures have been calculated using the following constants:

| Coefficients | Constant Value |
| --- | --- |
| $a_{SW}$ | −0.9984 |
| $b_{SW}$ | 0.0083 |
| $c_{SW}$ | 0.0009331 |
| $d_{SW}$ | −0.0093 |
| $e_{SW}$ | 0.0045 |

Although the model does not explicitly include the current passing through the stator coils 33, the effect of this current is included implicitly in the rotor speed $\omega$.

As mentioned above, one of the many drawbacks of a first-principle model is the non-availability of heat transfer coefficients. Another difficulty that is relevant to the calculation of the stator copper winding temperature $T_{SW}$ is the non-linearity that arises from differences in air-gap lengths between the stator and rotor 31 around the circumference of the rotor—the stator and rotor poles 40,41 are more closely spaces than the stator and rotor copper windings 33,36. Heat transfer across this gap therefore varies as a function of the commutation times. In addition, the damping term due to the speed of the motor is also non-linear and varies with the torque produced in the rotor shaft.

Because the effect of ohmic heating from eddy currents in the stator iron core 33 is minute compared with the heat generated within the stator windings and rotor bearings, the temperature of the stator core can be modelled as a function of the temperature of the stator copper windings. It has been found that the following single-input single-output bilinear model can be used to provide a good estimate of the stator core temperature:

$$T_{SC}(t_n) = AT_{SC}(t_{n-1}) + BT_{SW}(t_{n-1}) + CT_{SW}(t_{n-1})T_{SC}(t_{n-1})$$

where the calculation is performed iteratively at time intervals $\Delta t$ starting at an initial time to and for subsequent times $t_n = t_{n-1} + \Delta t$, $n=1,2,3\ldots$;

$T_{SC}(t_n)$ is the calculated temperature of the stator core component at a time $t_n$;

$T(t_{n-1})$ is the calculated temperature of the stator core at a time $t_{n-1}$;

$T_{SC}(t_0)$ is a known temperature of the stator core at the initial time $t_0$;

$T_{SW}(t_{n-1})$ is the temperature of the stator windings at a time $t_{n-1}$, calculated according to equation [1]; and A, B and C are constant values.

A plot against time t of measured 65 and estimated 66 stator winding temperatures calculated using this equation are shown in FIG. 5, which shows a cyclic operation of the supercharger motor 14 over a period of about 13 minutes. The estimated stator winding temperatures have been calculated using the following constants:

| Coefficient | Constant Value |
|---|---|
| $A_{SC}$ | −0.9820 |
| $B_{SC}$ | 0.0208 |
| $C_{SC}$ | −0.00010699 |

The calculation of the stator core temperature therefore makes use of the previously calculated stator winding temperature $T_{SW}(t)$, which further improves the efficiency of the thermal calculations compared with calculations based on first-principles.

Once the temperatures of components within the supercharger motor 14 have been calculated, it is possible to control the supercharger operation so that the temperatures of the components are kept within allowable limits. As explained above, this is done by selecting a "soft" temperature limit $L_1$ and a "hard" temperature limit $L_2$ for each component. If the estimated temperature of a component reaches the soft limit $L_1$ then software running in the engine control unit 32 acts to restrict the operation of the supercharger motor 14 in such a way that continued operation of the supercharger does not cause the temperature to exceed the hard limit $L_2$. In particular, the operation of the supercharger 10 may need to be progressively restricted, both to avoid a sudden loss of the supercharge boost provided by the supercharger, and to ensure that temperatures remain within the hard temperature limit $L_1$.

Soft and hard temperature limits (47,48;57,58;67;68) are therefore shown on each of FIGS. 3, 4 and 5. Each component may be assigned different soft and hard temperature limits, and the engine control unit 32 then restricts the operation of the motor 14 according to the temperature of the component nearest its temperature limits.

In FIGS. 3, 4 and 5, the operation of the supercharger is restricted owing to the estimated bearing temperature $T_{RB}$ between about 320 s and 400 s, and again between about 550 s and 650 s.

The invention described above is applicable to both spark ignition and compression engines. The supercharger may be the only inlet air supercharger device in the system, or it may be combined with another such device, for example an exhaust gas driven turbocharger device.

The invention therefore provides a convenient and economical electrical pressure boosting device and method for estimating the temperatures of critical components within a supercharger motor. The electrically driven pressure boosting device is provided as part of the engine's air intake system, and is fully electronically controllable within allowable thermal operating limits. Use of such a compressor device increases the engine's maximum torque output over portions of its operating range that are significant to the performance perceived by the driver. The invention is requires no additional thermal sensor devices beyond those conventionally present in an automotive environment, thus allowing benefits in terms of the cost of providing a supercharger unit, reliability and good operating lifetime.

What is claimed is:

1. A supercharger system for an internal combustion engine comprising:

a supercharger adapted to supply air to the engine, the compressor being driven by an electric motor having a rotor, the rotor rotating at an angular speed ω when the compressor is energized with electric current and the supercharger thereby drawing a mass airflow volume V;

a controller adapted to operate the supercharger;

an angular speed sensor coupled to the controller to measure the angular speed ω of the rotor;

an airflow volume sensor coupled to the controller to measure the mass airflow volume V;

wherein the controller is adapted to calculate the temperature T of at least one component of the supercharger using the measures of the rotor angular speed ω and the mass airflow volume M the temperature T of at least one component of the supercharger wherein the equation to calculate T is:

$$T(t_n)=aT(t_{n-1})+b\omega(t_{n-1})+cV(t_{n-1})d\omega(t_{n-1})T(t_{n-1})+eV(t_{n-1})\,T(t_{n-1}) \quad [1]$$

where:

the calculation is performed iteratively at time intervals Δt starting at an initial time $t_0$ and for subsequent times $t_n=t_{n-1}+\Delta t$, n=1,2,3 . . .;

$T(t_n)$ is the calculated temperature of the component at a time $t_n$;

$T(t_{n-1})$ is the calculated temperature of the component at a time $t_{n-1}$;

$V(t_{n-1})$ is the measured mass airflow volume at time $t_{n-1}$;

$\omega(t_{n-1})$ is the rotor angular speed at time $t_{n-1}$;

$T(t_0)$ is a known temperature of the component at the initial time $t_0$; and a, b, c, d, and e are constant values.

2. A supercharger system as claimed in claim 1, in which the controller is adapted to calculate the temperature $T_R(t_n)$ of the rotor.

3. A supercharger system as claimed in claim 1, in which the rotor spins on bearings, and the controller is adapted to calculate the temperature $T_{RB}(t_n)$ of the rotor bearings according to equation [1].

4. A supercharger system as claimed in claim 1, in which the electric motor has a stator and the controller is adapted to calculate the temperature $T_S(t_n)$ of the stator according to equation [1].

5. A supercharger system as claimed in claim 4, comprising stator windings through which electrical current flows when the electric motor is energized, in which the controller is adapted to calculate the temperature $T_{SW}(t_n)$ of stator windings according to equation [1].

6. A supercharger system as claimed in claim 4, comprising at least one stator core through which magnetic flux is concentrated when the electric motor is energized, in which the controller is adapted to calculate the temperature $T_{SC}(t_n)$ of the stator core according to the equation:

$$T_{SC}(t_n)=AT_{SC}(t_{n-})+BT_{SW}(t_{n-1})+CT_{SW}(t_{n-1})T_{SC}(t_{n-1}) \quad [2]$$

where:
 the calculation is performed iteratively at time intervals $\Delta t$ starting at an initial time $t_0$ and for subsequent times $t_n=t_{n-1}+\Delta t$, n=1,2,3 . . . ;
 $T_{SC}(t_n)$ is the calculated temperature of the stator core component at a time $t_n$;
 $T(t_{n-1})$ is the calculated temperature of the stator core at a time $t_{n-1}$;
 $T_{SC}(t_0)$ is a known temperature of the stator core at the initial time $t_0$;
 $T_{SW}(t_{n-1})$ is the temperature of the stator windings at a time $t_{n-1}$, calculated according to equation [1]; and
 A, B and C are constant values.

7. A supercharger system as claimed in claim 1, further comprising at least one sensor for providing to the controller a measure of the temperature of at least one engine operating parameter, wherein the controller is adapted to calculate said initial temperature $T(t_0)$ from said measure of at least one engine operating parameter.

8. A method of controlling the operation of a supercharger system for an internal combustion engine, the system comprising a supercharger with a rotor for supplying air to the engine, an electric motor for driving the supercharger, and a controller adapted to operate the supercharger, comprising the steps of:
 using the electric motor to drive the supercharger at an angular speed $\omega$ and to draw through the supercharger a mass airflow volume V;
 measuring the angular speed $\omega$ of the rotor;
 measuring the mass airflow volume V of the supercharger;
 calculating the temperature T of at least one component of the supercharger, using the measures of the rotor angular speed $\omega$ and the mass airflow volume V;

wherein the equation to calculate T is:

$$T(t_n)=aT(t_{n-1})+b\omega(t_{n-1})+cV(t_{n-1})d\omega(t_{n-1})T(t_{n-1})+eV(t_{n-1})T(t_{n-1}) \quad [2]$$

where:
 the calculation is performed iteratively at time intervals at starting at an initial time to and for subsequent times $t_n=t_{n-1}+\Delta t$, n=1,2,3 . . . ;
 $T(t_n)$ is the calculated temperature of the component at a time $t_n$;
 $T(t_{n-1})$ is the calculated temperature of the component at a time $t_{n-1}$;
 $V(t_{n-1})$ is the measured mass airflow volume at time $t_{n-1}$;
 $\omega(t_{n-1})$ is the rotor angular speed at time $t_{n-}$;
 $T(t_0)$ is a known temperature of the component at the initial time $t_0$; and
 a, b, c, d, and e are constant values;
 controlling the operation of the supercharger in accordance with said calculated temperature.

9. A method as claimed in claim 8, which further comprises the step of disabling operation of the supercharger if a calculated temperature T exceeds a predetermined hard limit.

10. A method as claimed in claim 9, which further comprises the step of restricting operation of the supercharger progressively, wherein a calculated temperature T exceeds a predetermined soft limit and rises towards the hard limit.

11. A method as claimed in claims 8, wherein the controller calculates a plurality of temperatures for different components of the supercharger, each component having a predetermined temperature limit, the controller restricting or disabling operation of the supercharger according to the calculated temperature for the component closest to its predetermined limit.

* * * * *

UNITED STATES PATENT AND TRADEMARK OFFICE
CERTIFICATE OF CORRECTION

PATENT NO. : 6,823,853 B2
DATED : November 30, 2004
INVENTOR(S) : Ian D. Clarkson et al.

It is certified that error appears in the above-identified patent and that said Letters Patent is hereby corrected as shown below:

Column 12,
Line 34, delete "$d\omega$" and substitute -- $+\, d\omega$ -- in its place, and at the end of the line delete "[1]".
Line 42, delete "$t_{n\text{-}}$;" and substitute -- $t_{n\text{-}1}$; -- in its place.

Column 13,
Line 5, delete "($t_{n\text{-}}$)" and substitute -- ($t_{n\text{-}1}$) -- in its place, and at the end of the line delete "[2]".

Column 14,
Line 3, delete "$d\omega$" and substitute -- $+\, d\omega$ -- in its place, and at the end of the line delete "[2]".
Line 6, delete "at" and substitute -- $\Delta t$ -- in its place.
Line 7, delete "to" and substitute -- $t_o$ -- in its place.
Line 10, delete "$t_{n\text{-}}$;" and substitute -- $t_{n\text{-}1}$; -- in its place.
Line 33, delete "claims 8," and substitute -- claim 8, -- in its place.

Signed and Sealed this

Twenty-eighth Day of June, 2005

JON W. DUDAS
*Director of the United States Patent and Trademark Office*